US006276412B1

(12) United States Patent
Johnston et al.

(10) Patent No.: US 6,276,412 B1
(45) Date of Patent: Aug. 21, 2001

(54) TIMBER INCISOR

(76) Inventors: James E. Johnston, deceased, late of Pineville, LA (US); by Rita Vidrine Johnston, administratrix, 2298 Fairview Dr., Pineville, LA (US) 71360

( * ) Notice: Subject to any disclaimer, the term of this patent is extended or adjusted under 35 U.S.C. 154(b) by 0 days.

(21) Appl. No.: 09/589,956

(22) Filed: Jun. 8, 2000

(51) Int. Cl.[7] ............................ A01G 23/00; B27M 1/02; B27C 1/00

(52) U.S. Cl. .......................... 144/24.1; 144/2.1; 144/237; 144/362

(58) Field of Search .................................... 144/2.1, 24.1, 144/213, 218, 233, 237, 241, 362

(56) References Cited

U.S. PATENT DOCUMENTS

| | | | | |
|---|---|---|---|---|
| 1,346,126 | * | 7/1920 | Howe | 144/24.1 |
| 2,684,089 | * | 7/1954 | Graham et al. | 144/24.1 |
| 2,940,489 | * | 6/1960 | Feiner | 144/237 |
| 3,082,802 | * | 3/1963 | Dickson et al. | 144/237 |
| 3,478,790 | | 11/1969 | Augustin | 144/24.1 |
| 4,137,956 | | 2/1979 | Toberg | 144/24.1 |
| 4,219,060 | | 8/1980 | Hasegawa | 144/213 |
| 4,318,433 | | 3/1982 | Amundsen | 144/24.1 |
| 4,790,360 | | 12/1988 | Clarke | 144/362 X |

* cited by examiner

*Primary Examiner*—W. Donald Bray
(74) *Attorney, Agent, or Firm*—Jones, Walker, Waechter, Poitevent, Carrere & Denegre, L.L.P.

(57) ABSTRACT

In a timber incising machine incorporating a shaft mounted rotating incisor drum, an improved incising drum comprising a shaft configured for rotation by the incising machine; a plurality of circular incisor plates, each of the incisor plates having a plurality of equally spaced incisor teeth extending radially from the radial edge of the circular incisor plates at a desired location. A plurality of incisor plates are stacked in a desired quantity and positioned to place the incisor teeth in a desired pattern and fixed together to form a plate array as a single unit. A plurality of the plate arrays are mounted on the shaft so as to form a rotatable drum having a plurality of radially extending incisor teeth positioned in a desired pattern.

14 Claims, 6 Drawing Sheets

TIMBER INCISOR

FIELD OF INVENTION

This invention generally relates to the field of incising wooden timbers to enhance the timber curing and treating process. More particularly, it provides an improved incising blade and blade configuration for perforating the surfaces of rectangularly cross-sectioned timber in a desired pattern.

BACKGROUND OF INVENTION

Wooden timbers such as those to be used for railroad ties are cured and treated to enhance their structural integrity and serviceability. Standards for treating and curing railroad ties have been adopted, an example of such standards being those set forth in the Manual for Railway Engineering provided by AREMA, the American Railway Engineering and Maintenance-of-way Association. AREMA requires that outer surface of railroad ties be perforated or incised during the curing process in order to reduce checking or splitting of the ties. Such incising is to be performed in a specified pattern of perforations.

Incisors having driven drums with protruding teeth are often utilized to perform the incising tasks. Some incising drums utilize cutting teeth that are clamped or bolted onto the drum assembly. Teeth in such drum assemblies are often bent, broken or lost during the incising process. Drum having bent, broken or lost incising teeth will produce irregular or unwanted incising patterns. Replacement of these teeth is time consuming and expensive and increases the cost of the incising process.

Other incising drum combinations such as that described in U.S. Pat. No. 4,137,956 to Toberg are comprised of a plurality of individual annular tooth rings separated by one of more spacer rings. The tooth rings described in Toberg have outwardly extending angularly equi-spaced teeth. The tooth rings and spacer rings are fixed on a central core to form the incising drum by means of a keyway located on each tooth ring and a key that fits into the central core. The keyway is positioned on the ring at one-quarter of the angle between adjacent teeth on the tooth ring. The tooth rings are arranged on the central core so that the teeth of every other tooth ring are offset from the teeth of its adjacent tooth ring by one-half of a tooth spacing by rotating every other tooth ring. Multiple spacer rings are utilized to adjust the spacing between adjacent tooth rings.

To assemble the tooth ring drum of Toberg for incising timber in a desired pattern, many individual tooth rings and spacer rings must be utilized. This presents a disadvantage when tooth rings must be replaced during maintenance of the incisor drum. The individual tooth rings must be placed in a particular order in order to achieve the desired spacing. The disassembly and re-assembly of the many tooth and spacer rings in the desired configuration increases the time and therefore the cost of the drum maintenance.

Another disadvantage of Toberg is that the fixed angular position of the keyway on the tooth rings limits the amount of adjustment and variation that can be made to the array of teeth on the drum form from such rings. This in turn limits the adjustments that can be made to points of incising on the timber as it is drawn through an incising machine.

Consequently, a need exist for improvements in drum incisor configuration that will allow for the incising of timber in a desired pattern, reduce the incidence of bent, broken or lost incisor teeth, and reduce the time associated with drum maintenance.

SUMMARY OF INVENTION

The present invention provides an incisor drum assembly designed to satisfy the aforementioned needs. It is contemplated for use on drum incisors used for incising timbers such as railroad ties. The incisor drum assembly is comprised of multiple arrays of circular incisor plates. Each incisor plate of each plate array has a plurality of radially protruding teeth. The incisor teeth are integrally formed with the incisor plate and positioned around the radial edge of the plate. Each of the teeth is positioned at a desired angle of offset from the centerline of each plate. In the preferred embodiment, the teeth of adjacent incisor plates in each array of plates are offset from the teeth of its succeeding plate a desired increased angular amount. The incisor plates are then stacked in a desired sequence and welded together in a single unit to form the plate array. In this manner a desired pattern of incising teeth can be achieved for each plate array.

In the preferred embodiment each array of plates consists of four incisor plates welded together. Each plate in each array of plates has a uniformly configured slot positioned on the centerline of the plate. Each slot has a keyway extending outward from the slot. The slots and keyways of each plate in the array are aligned when the plate array is formed and welded. The slot extends to the center of the plate for mounting each plate array around a rotatable central shaft.

The shaft of the drum assembly is mounted on a base plate. Both the shaft and the base plate have recesses that form a keyway in combination with the plate keyways of each plate array when the plate arrays are arranged along the shaft with the shaft and base plate recesses and the plate keyways in alignment. A key is inserted into the keyways to lock and hold each array of plates from rotation independent of the shaft. An incisor drum is formed by stacking and locking a desired number of plate arrays in position along the shaft are then clamping them together between the shaft base plate and a cap plate by means of a threaded lock nut assembly. Fixing the plate arrays of the shaft allows rotation of the shaft and plates together as the shaft and consequently the drum assembly is turned by the incisor machine.

An inventory of plate arrays having incisor teeth positioned in a desired pattern can be maintained. When an incising job requires a desired pattern, such as a pattern that might be specified by AREMA, an incisor drum assembly can be made up of plate arrays having a desired configuration to perform the specified incising pattern. Because the incisor teeth of the plate arrays integrally formed with the incisor plate they are less likely to bend or break during use.

Consequently, it is an object of this invention to provide an incisor drum comprised of a plurality of plate arrays, each array being formed from a plurality of incisor plates fixed together to form a single unit.

It is another object of the invention to provide incisor plates for each plate array of the incisor drum having plurality of teeth that extend from and that are positioned at a desired location around the radial edge of each plate.

It is another object of this invention to position the plates of each plate array in the incising drum adjacent to each other so as to provide a desired configuration of teeth for incising timber in a desired pattern.

It is another object of this invention to vary the spacing of teeth in succeeding plates in a plate array a desired amount to achieve a desired incising pattern.

It is another object of this invention provide multiple units of plate arrays to form an incising drum.

It is still another object of this invention to provide an incisor drum that can be easily disassembled and reassembled for maintenance and replacement of plate arrays.

It is still another object of this invention to provide plate arrays for an incising drum that are comprised of plates having incising teeth integrally formed with the plate to maintain the teeth in a fixed and stable position on the drum and reduce the incidence of broken, bent or lost teeth that may result in irregular incising patterns.

DESCRIPTION OF PREFERRED EMBODIMENT

Figure 1:
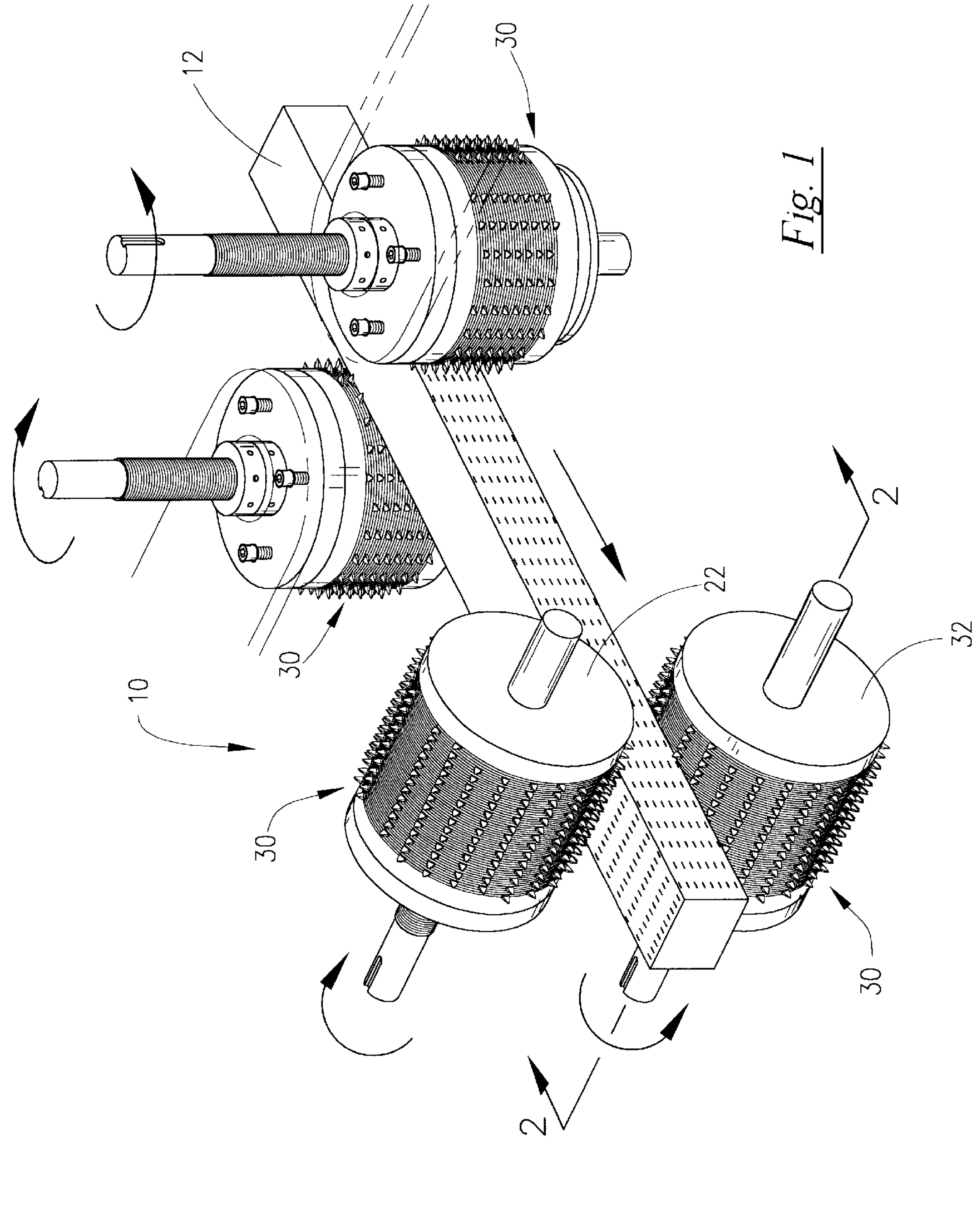
FIG. 1 is a schematic representation of a typical incising drum configuration utilized for incising timber.

Referring now to the drawings and more particularly to FIG. 1, there is shown a schematic representation of a typical incising drum configuration (10) for incising a rectangular timber tie (12). In the preferred embodiment, incising drum assemblies (30) are mounted within an incising machine for rotating the drum assemblies. Drum assemblies (30) are positioned above and below and on either side of the timber tie (12). When a timber tie (12) is placed between the rotating drum assemblies (30), a desired pattern of perforations or incisions (14) is imparted to the outer surfaces of the timber tie (12).

Figure 2:
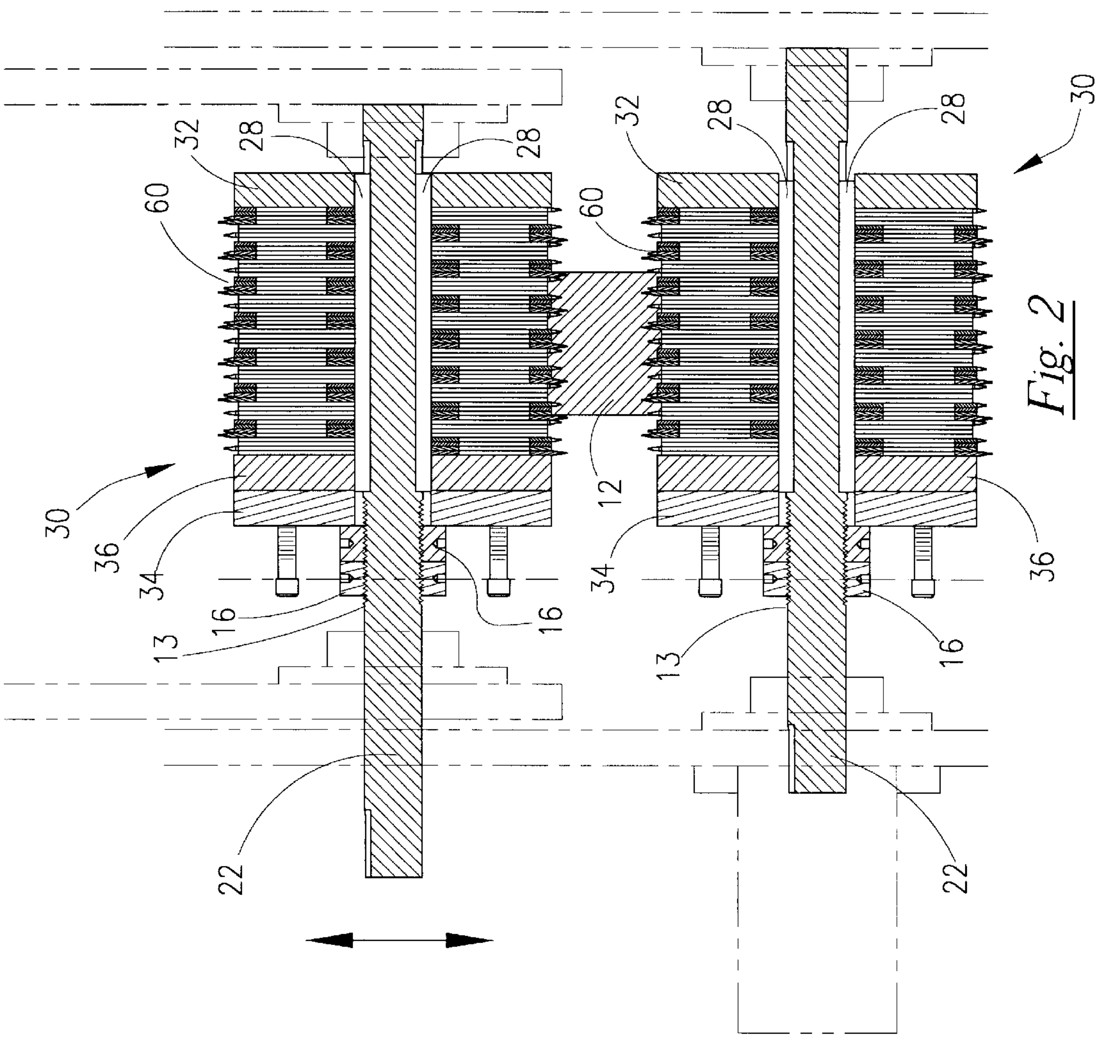
FIG. 2 is a cross-sectional elevation view of the incising drum configuration of the present invention.
Figure 3:
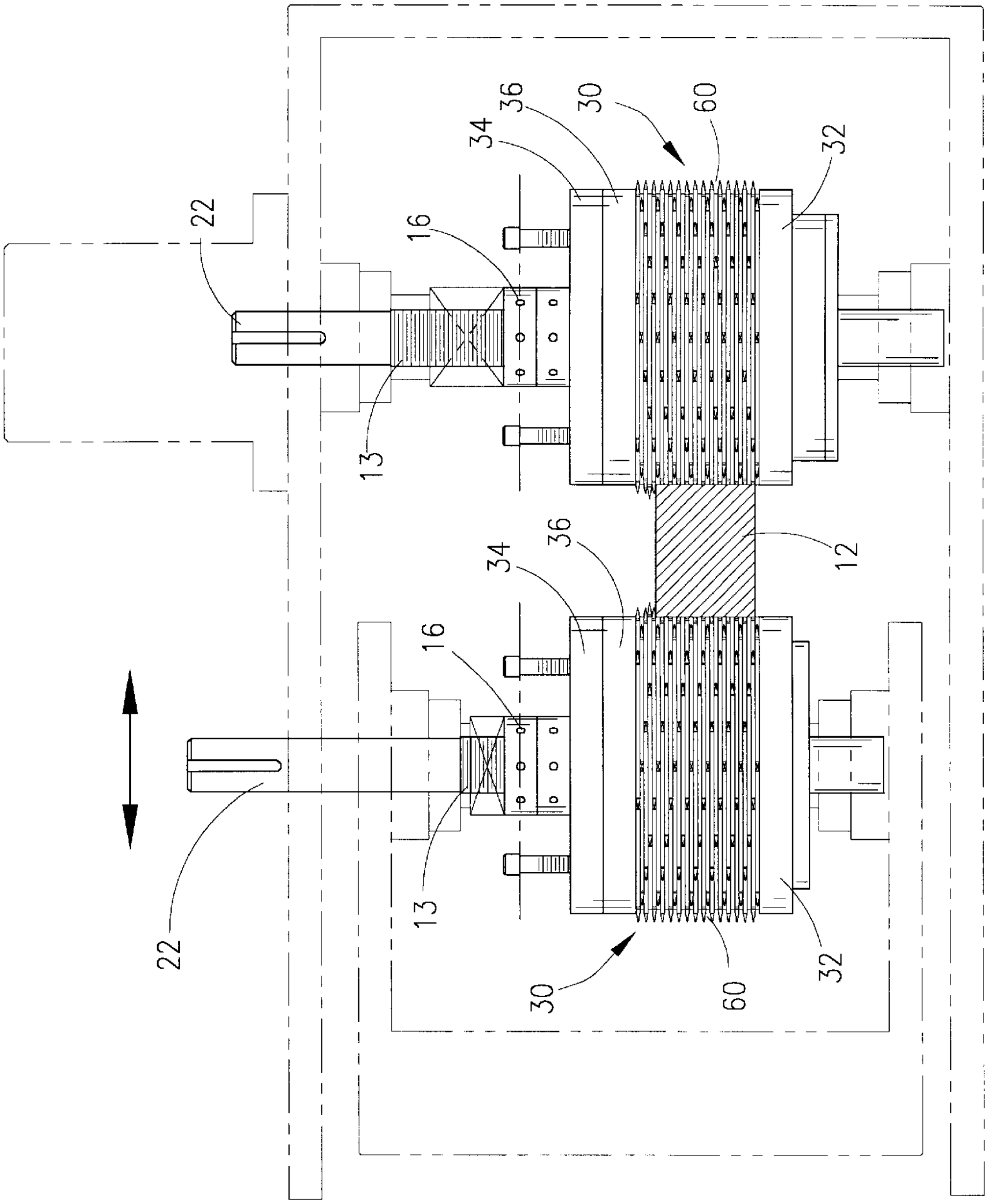
FIG. 3 is an elevation view of the incising drum configuration of the present invention.

FIG. 2 shows a cross-sectional elevation view of the timber incising configuration of FIG. 1. Incising drum assemblies (30) are positioned above and below timber tie (12) for imparting insising to the upper and lower surfaces of the tie (12). Each drum assembly (30) is comprised of a plurality of incisor plate arrays (60) mounted along a rotatable shaft (22). The plate arrays (60) are positioned on the shaft (22) between a base plate (32) that is fixed to the shaft (22) and cap plates (34) and (36). The shaft (22) has a threaded segment (13) for receiving lock nuts (16) to secure the plate arrays (60) between the base plate (32) and the cap plates (34, 36). Typically, for most incising machines, the shaft (22) of the lower drum assembly (30) is rotated by an electric motor, or other shaft rotating means, incorporated into the incisor machine. The upper drum assembly is rotated by communication with the timber tie (12) as it is drawn between the upper and lower drum assemblies. Similarly, FIG. 3 shows a side elevation view of an incisor drum assembly (30) positioned on either side of a timber tie (12) for imparting incising to the sides of the tie (12) in a like manner. However, the drum assembly (30) could be utilized in an incising machine where each drum assembly (30) is rotated by the incising machine motors.

Figure 4:
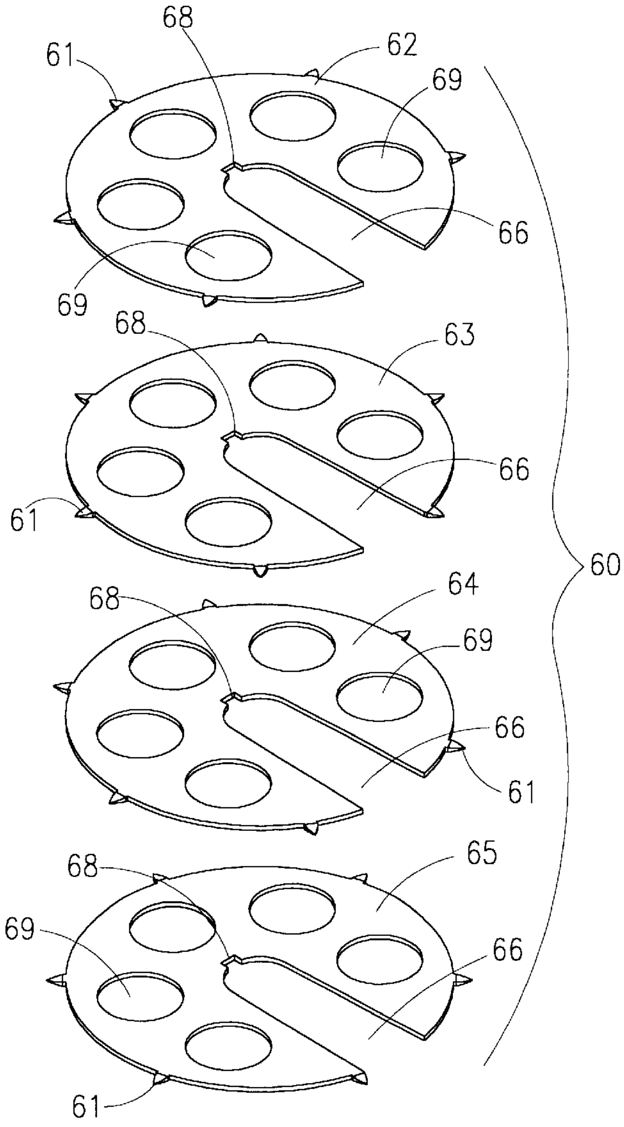
FIG. 4 is an exploded view of the preferred embodiment of an incisor plate array.
Figure 12:
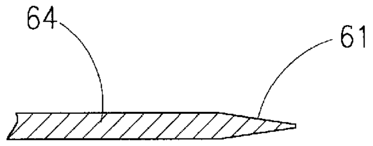
FIG. 12 is a cross-sectional view of a typical incisor plate tooth.

An exploded view of the preferred embodiment of a plate array (60) comprised of individual incising plates (62, 63, 64, 65) is shown in FIG. 4. Each plate array (60) is comprised of four individual circular incisor plates (62, 63, 64, 65). Each of the incisor plates (62, 63, 64, 65) has a plurality of equally spaced incisor teeth (61) integrally formed with the plates (62, 63, 64, 65). The teeth (61) protrude radially from the peripheral edge of each plate (62, 63, 64, 65). As shown in FIG. 12, the teeth (61) are formed into a knife-like edge for incising a timber surface.

Figure 6:
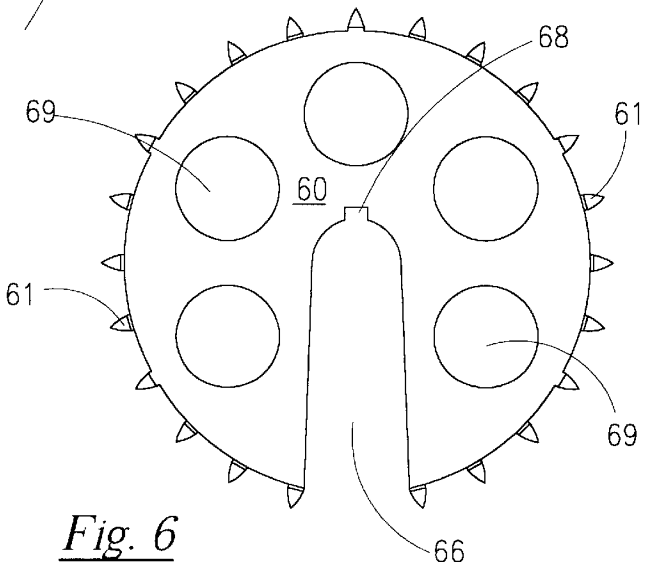
FIG. 6 is a top view of the assembled incisor plate array of FIG. 4.

Each plate (62, 63, 64, 65) in each plate array (60), as shown in FIG. 4, has a uniformly configured slot (66) that extends to the center of the plate for receiving the shaft (22). Each slot (66) has a keyway (68) extending outward from the slot (66). As shown in FIG. 6, the plates (62, 63, 64, 65) of each array (60) are arranged and stacked so that the slots (66) and the keyways (68) of each plate (62, 63, 64, 65) are in alignment. To save weight in the ring, openings (69) may be made in each plate (62, 63, 64, 65) to remove unnecessary material.

Figure 8:
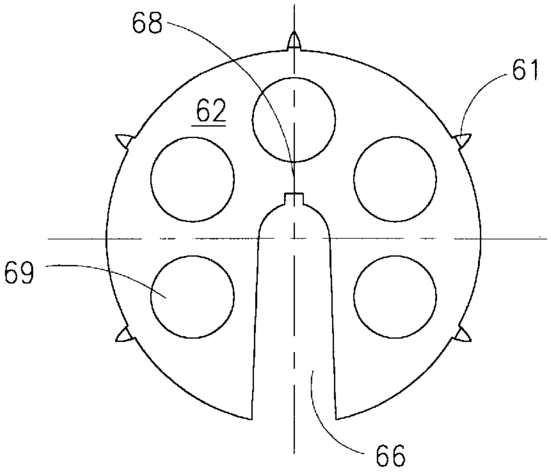
FIGS. 8–11 show a plan view of the incisor plates of the plate array of FIG. 4.
Figure 9:
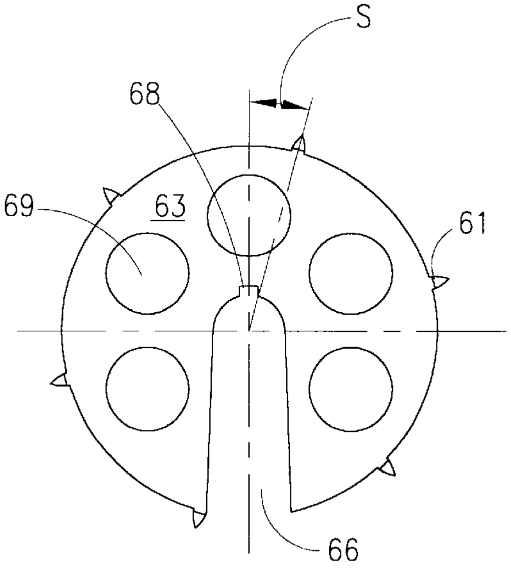
Figure 10:
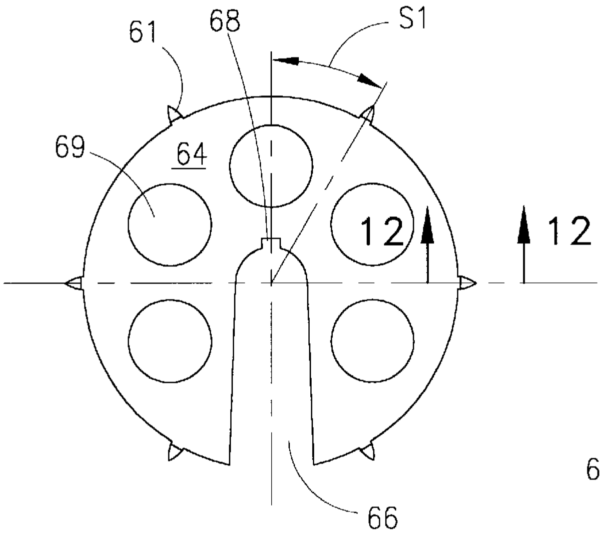
Figure 11:
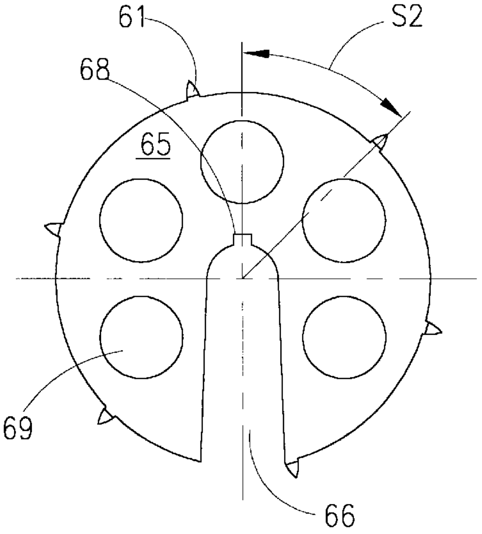

As shown in FIG. 8 through FIG. 11, each of the teeth (61) of each plate (62, 63, 64, 65) is integrally formed with the plate and spaced at a desired increased angle of offset from the centerline of each plate (62, 63, 64, 65). The first of the equally spaced incisor teeth (61) of plate (62) as shown in FIG. 8 is positioned on the center line of the plate (62) and the slot (66). The first of the equally spaced incisor teeth (61) of plate (63) shown in FIG. 9 is positioned a desired increased distance S from the center line of the plate (63) and the slot (66) than that of the first tooth (61) of plate (62). The first of the equally spaced incisor teeth (61) of plate (64) in FIG. 10 is positioned a desired distance $S_1$ from the center line of the plate (64) and the slot (66) than that of the first tooth (61) of plate (63). Similarly, the first of the equally spaced incisor teeth (61) of plate (65) in FIG. 11 is positioned a desired distance $S_2$ from the center line of the plate (65) and the slot (66) than that of the first tooth (61) of plate (64).

Figure 5:
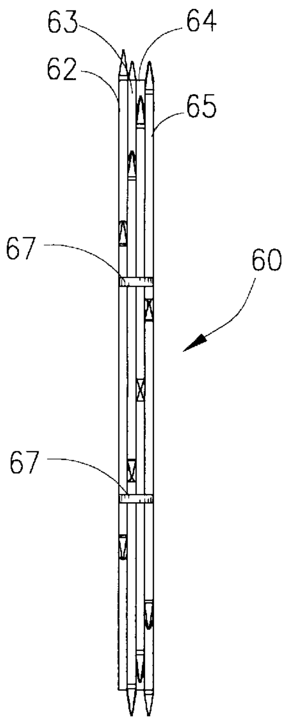
FIG. 5 is a side view of the assembled incisor plate array of FIG. 4.

As depicted in side view in FIG. 5 and in top view FIG. 6, the array (60) is formed by arranging and stacking the incisor plates (62, 63, 64, 65) in the desired so that each slot (66) of each of the plates (62, 63, 64, 65) is in alignment. The plates (62, 63, 64, 65) are then secured by tack welds (67) or other fastening means to create a single unit. When the plates (62, 63, 64, 65) are so arranged, a desired pattern of incising teeth (61) may be disposed to extend radially around each array (60) of incisor plates (62, 63, 64, 65). When a desired incising pattern is specified, such as a pattern set forth by AREMA, the spacing of the incisor teeth in each plate array can be arranged to conform to the specified pattern.

Different incising patterns can be maintained by keeping an inventory of plate arrays (60) having a desired configuration of incising teeth (61). The incising pattern of a drum assembly (30) can be changed simply by replacing the plate array (60) with another plate array having a different and desired pattern of incising teeth when completing the drum assembly (30).

Figure 7:
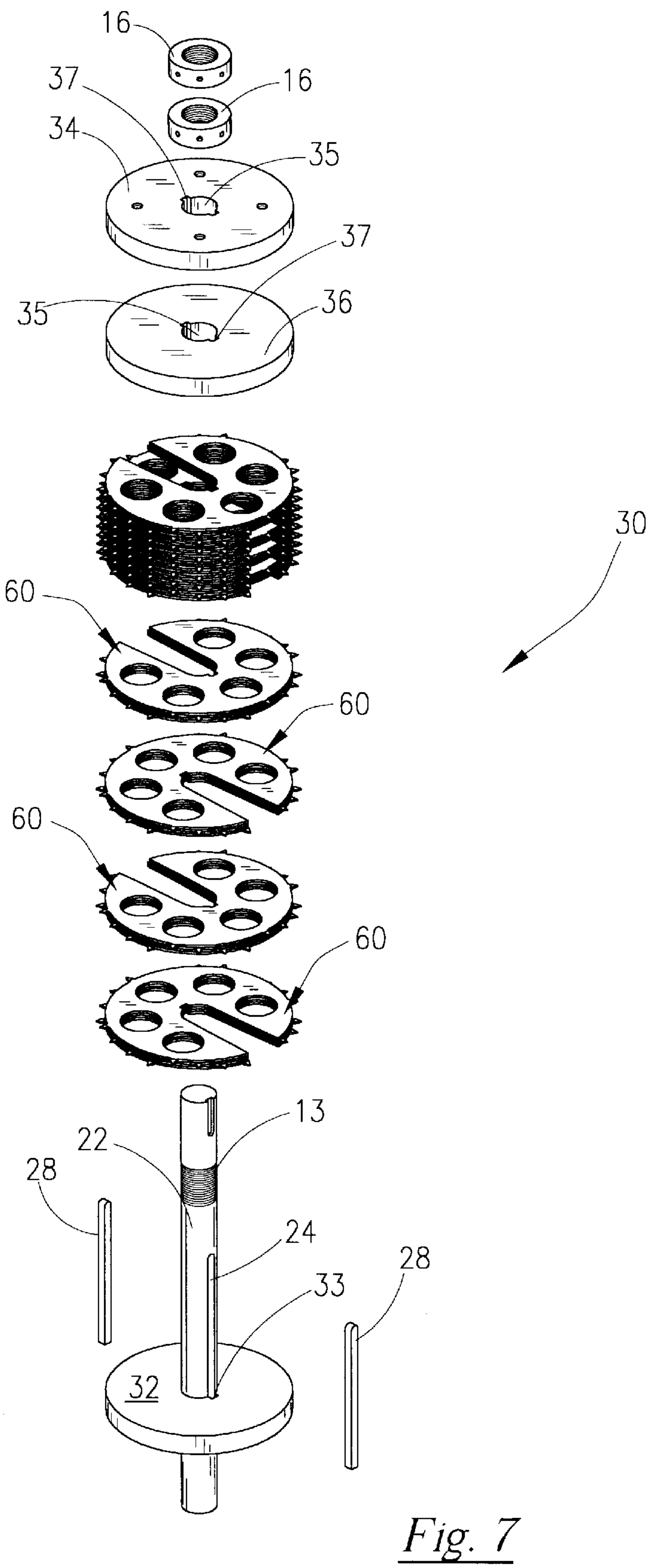
FIG. 7 is an exploded view of the incisor drum configuration of FIG. 2.

FIG. 7 is an exploded view of the preferred embodiment of the drum assembly (30). The drum assembly (30) is comprised of the shaft (22) mounted to the base plate (32), a plurality of plate arrays (60), cap plates (34, 36), and multiple lock nuts (16). The shaft (22) has a threaded segment (13) distal from the base plate (32) for receiving the lock nuts (16) to secure the cap plates (34, 36) and clamp the plate arrays (60) tightly between the base plate (32) and the cap plates (34, 36). The base plate (32) also has a pair of recesses (33) positioned opposite each other that corresponds with a pair of shaft grooves (24) that form a keyway (26) for receiving shaft key (28).

The drum assembly (30) is assembled by stacking a plurality of plate arrays (60) along the shaft (22) so as to alternatively align the plate keyways (68) of each succeeding plate array (60) with an opposing shaft grove (24). The arrays (60) are then secured on the shaft by inserting a shaft key (28) into the plate keyways (68), each shaft groove (24), and each base plate recess (33). In the preferred embodiment, the cap plates (34, 36) are then fitted onto the shaft (22) by means of the cap bore (35) to abut the plate arrays (60). The threaded lock nuts (16) are then threadably mounted onto the threaded shaft segment (13) to secure and clamp the plate arrays (60) between the base plate (32) and the cap plates (34, 36). It is understood that other means for tightly securing the plate arrays (60) between the base plate (32) and the cap plates (34, 36) could be utilized.

When completed the incising drum (30) is formed from a desired quantity of plate arrays (60) disposed along the shaft (22). The drum (30) may then be utilized in an incisor machine incorporating a means for rotating the shaft (22) and consequently, the plate arrays (60) of the drum (30). When the surface of a timber tie (12) is positioned to communicate with the rotating drum plate arrays (60), a desired pattern of incisions is made into the tie surface by the rotating teeth (61) of the drum (30).

The drum assembly (30) can be easily disassembled by reversing the assembly process to replace plate arrays that may have broken or bent teeth or to change plate arrays to those having another incising pattern and then reassembled for use. Because the incising plates (62, 63, 64, 65) are fixed together in the plate array (61), less time is needed assembly and disassembly of the incising drum. This results in a savings of time during maintenance and repair of the drum as well as savings of time in changing plates to achieve a desire pattern and ultimately reduces the cost of the incising process.

It is thought that the timber incisor blade apparatus and blade assembly method described herein and many of its intended advantages will be understood from the foregoing description. It is also thought that various changes in form, construction, and arrangement of the parts of the incisor blade apparatus, and in the blade assembly method, may be made without departing from the spirit and scope of the invention described herein. The form herein described is intended to be merely illustrative of the preferred embodiment of the invention.

What is claimed is:

1. A timber incising drum assembly comprising:

(a) a rotatable shaft;

(b) a plurality of individual circular incisor plates, each of said plates having a plurality of radially disposed, equally spaced teeth positioned at a desired location on said plates, said plates being stacked together in a desired sequence and fixed together to form a plurality of plate arrays;

(c) means for positioning each of said plate arrays along said shaft; and (d) means for fixing said plurality of said plate arrays along said shaft.

2. In a timber incising machine incorporating a rotating incisor drum, an improved incising drum comprising:

(a) a shaft configured for rotation by said incising machine;

(b) a plurality of circular incisor plates, each of said incisor plates having a plurality of equally spaced incisor teeth, each of said incisor teeth extending radially from the radial edge of said circular incisor plates and positioned on said radial edge at a desired location;

(c) a plurality of plate arrays formed from a desired quantity of said incisor plates, said desired quantity of incisor plates being stacked one upon the other and disposed to position said incisor teeth of said incisor plates in a desired pattern, said incisor plates being fixed together to form a single unit;

(d) means for positioning said plate arrays on said shaft; and (e) means for fixing said plurality of plate arrays on said shaft so as to form a rotatable drum with said shaft, said drum having a plurality of radially extending incisor teeth.

3. The improved incising drum assembly as recited in claim 2 wherein, said incisor teeth are integrally formed with said incisor plates.

4. The improved incising drum assembly as recited in claim 3 wherein, said means for positioning said plate arrays on said shaft includes providing a plurality of incisor plates, each of said incisor plates having a slot for positioning said plates on said shaft, said slots of each of said incisor plates being aligned when said plates are fixed together in said plate array.

5. The improved incising drum assembly as recited in claim 4 wherein, means for fixing said plurality of plate arrays on said shaft so as to form a rotatable drum includes a base plate mounted on said shaft, at least one cap plate positioned on said shaft, and means for clamping said plate arrays between said base plate and said cap plate.

6. The improved incising drum assembly as recited in claim 5 wherein, said means for clamping said plate arrays between said base plate and said cap plate includes a lock nut.

7. The improved incising drum assembly as recited in claim 6 wherein said means for fixing said plurality of plate arrays on said shaft so as to form a rotatable drum includes a key and a keyway for receiving said key, said keyway formed from a keyway in each of said incisor plate slots, a longitudinal groove in said shaft and a recessed area in said base plate.

8. The improved incising drum assembly as recited in claim 7 wherein, each of said incisor teeth of each of said incisor plates is positioned at a desired angle of offset from the centerline of each of said incisor plates.

9. The improved incising drum assembly as recited in claim 7 wherein, the first of said plurality of incisor teeth of each succeeding incising plate in said stack of incisor plates in each of said plate arrays is offset from the first of said incisor teeth of its preceding incisor plate a desired increased angular amount so as to produce a desired pattern of incising teeth in each of said plate arrays.

10. In a timber incising machine incorporating a rotating incisor drum, an improved incising drum comprising:

(a) a shaft configured for rotation by said incising machine;

(b) a plurality of circular incisor plates, each of said incisor plates having a plurality of equally spaced incisor teeth integrally formed with each of said plates, each of said incisor teeth extending radially from the radial edge of each of said incisor plates, the first of each of said incisor teeth of each said incisor plates being positioned on said radial edge of each of said incisor plates at a desired location;

(c) a plurality of plate arrays formed from a desired quantity of said incisor plates, said desired quantity of incisor plates being stacked one upon the other whereby said first tooth of said plurality of incisor teeth of the first said incisor plate in each of said plate arrays is offset from said first incisor tooth of its preceding incisor plate a desired increased angular amount so as to position said incisor teeth of each of said incisor plates in a desired pattern, said incisor plates being fixed together to form a single unit;

(d) means for positioning said plate arrays on said shaft; and (e) means for fixing said plurality of plate arrays on said shaft so as to form a rotatable drum with said shaft, said drum having a plurality of radially extending incisor teeth.

11. The improved incising drum assembly as recited in claim 10 wherein, means for positioning said plate arrays on said shaft includes each of said incisor plates in each of each of said plate arrays having a slot for positioning said incisor plates on said shaft, said slot having keyway, each said slot and each said keyway being aligned when said incisor plates are fixed together in said plate arrays.

12. The improved incising drum assembly as recited in claim 11 wherein, means for fixing said plurality of plate arrays on said shaft so as to form a rotatable drum includes a key, a base plate mounted on said shaft and at least one cap plate, said shaft having a longitudinal groove and said base plate having a recess so as to form a keyway in combination with said incisor plate slot keyways when said plate recess, said shaft groove, and said slot keyways are in alignment for receiving said key.

13. The improved incising drum assembly as recited in claim 12 wherein, means for fixing said plurality of plate arrays on said shaft so as to form a rotatable drum includes means for clamping said plate arrays between said base plate and said cap plate.

14. The improved incising drum assembly as recited in claim 13 wherein, said means for clamping said plate arrays between said base plate and said cap plate includes providing a threaded segment on said shaft for receiving a lock nut.

* * * * *